F. L. LUCAS.
TROLLEY GUARD.
APPLICATION FILED FEB. 28, 1910.

968,247.

Patented Aug. 23, 1910.

2 SHEETS—SHEET 1.

Fig. 1.

Witnesses
Jos Gregory
L. N. Gillis

Inventor
F. L. Lucas

By Chandler & Chandler
Attorneys

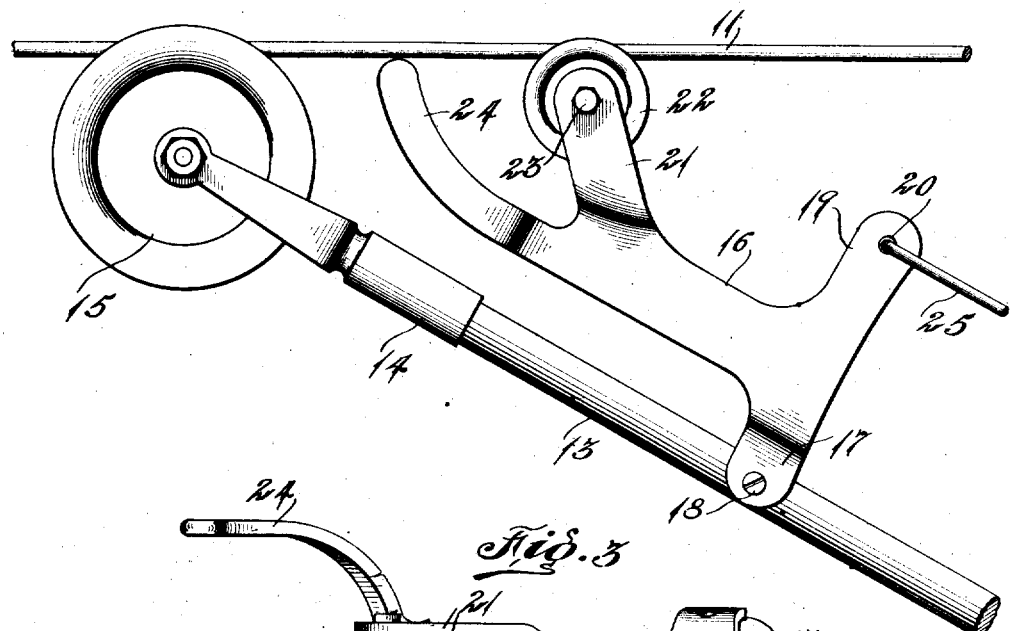
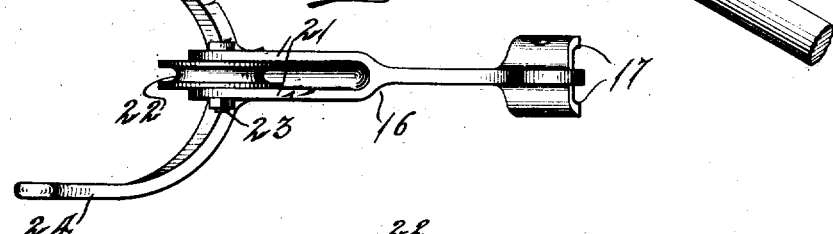
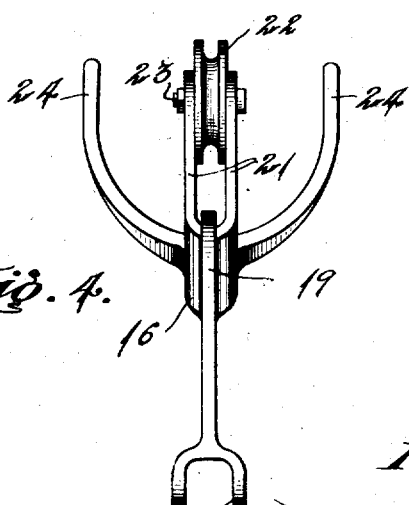

UNITED STATES PATENT OFFICE.

FLORION L. LUCAS, OF WINBURNE, PENNSYLVANIA.

TROLLEY-GUARD.

968,247.  Specification of Letters Patent.  Patented Aug. 23, 1910.

Application filed February 28, 1910. Serial No. 546,390.

*To all whom it may concern:*

Be it known that I, FLORION L. LUCAS, a citizen of the United States, residing at Winburne, in the county of Clearfield, State of Pennsylvania, have invented certain new and useful Improvements in Trolley-Guards; and I do hereby declare the following to be a full, clear, and exact description of the invention, such as will enable others skilled in the art to which it appertains to make and use the same.

This invention relates to trolleys of the type employed on electric cars which receive their motive power from an overhead wire.

The invention more especially relates to a guard for such trolleys.

One object of the invention is to provide an improved general construction of guard of this type, the guard being so arranged that it will normally lie below the cross wires commonly used for suspending the trolley wire of electric railway systems, the guard thus being inoperative under ordinary conditions.

Another object of the invention is to provide a trolley for electric cars with a combined guide wheel and guard so that the trolley becomes, in substance, a double wheel trolley and thus has less tendency than a single wheel trolley to leave the trolley wire.

With the above and other objects in view, the invention consists in general of an attachment for trolleys for electric cars adapted to retain the trolley wheel on the wire under ordinary conditions and to prevent said trolley wheel from swinging away from the wire in case of displacement, the attachment being of novel arrangement and character.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a side elevation of a portion of an electric car equipped with this invention, the trolley wire being also shown. Fig. 2 is an enlarged detail side elevation of the head of a trolley pole with the improved guide and guard attached, the parts being shown in connection with a trolley wire. Fig. 3 is a top plan view of the attachment removed from the trolley pole, the view showing only that portion of the device located at the head of the trolley pole. Fig. 4 is a perspective view of the attachment shown in Fig. 3, the view being taken from one end and directly facing said end.

There are shown in the present drawings a car 10 of the usual type and a trolley wire 11, the car being provided with the ordinary trolley base 12, pole 13, harp 14, and trolley wheel 15.

The attachment comprises a body portion 16 and having downwardly extending spaced arms 17 which straddle the trolley pole 13 adjacent the head thereof and are pivoted to this pole by screws 18. At 19 is an arm which extends upward from the body portion 16 and lies opposite the arms 17. This arm 19 is provided with an opening 20 for purposes hereinafter to be described. Both the arms 14 and the arm 19 lie at what may be termed the lower end of the body 16. Extending upward at an angle to the body 16 and springing from the upper side of the upper end of said body are spaced arms 21 between which is held an auxiliary trolley wheel 22, the wheel revolving on a journal bolt 23. From the lower part of the upper end of the body spring outwardly and upwardly curved spaced arms 24, the upper ends of these arms terminating below the horizontal plane of the trolley wire when the trolley wheels 15 and 22 are engaged thereon. The arms 24 are spaced at such distance apart at their upper ends that if the trolley wheels 15 and 22 jump the wire one of these arms will be certain to engage the wire and prevent the trolley from swinging laterally away from said wire.

It will be observed that the body 16 is normally held substantially parallel to the trolley pole 13 and that, unless prevented, it would tend to drop at its upper end and free the trolley wheel 22 from the trolley wire. In order to prevent this the arm 19 has secured thereto, by means of the opening 20, a link 25 to the lower end of which is attached one end of a spring 26, the lower end of this spring being attached to some fixed point on the trolley base 12. This spring is a tension or retractile spring and its tendency is to rotate the guard about the pivot 18 in such manner as to throw the arms 24 upward, the tendency being resisted by the auxiliary trolley wheel 22.

In the operation of this device the auxiliary trolley wheel tends to guide the main trolley wheel along the wire but if the trolley wheels jump the wire the fork of the device catches the wire as previously described.

There has thus been provided a simple and efficient device of the kind described and for the purpose specified.

Having thus described the invention, what is claimed as new, is:—

1. In a device of the kind described, the combination with a trolley pole having a trolley wheel at its upper end; of an attachment therefor comprising a substantially T-shaped member having one of the arms of the T forked and pivoted to the pole below said trolley wheel and the stem of the T extending normally parallel to the pole above the pivot point, a fork extending at an angle to the stem of the T, an auxiliary trolley wheel carried in said fork and adapted to roll on the trolley wire on which the first mentioned trolley wheel rolls, a pair of widely spread arms forming a fork extending from the end of the stem of the T, said arms being curved outward and upward, and means normally urging said stem upward.

2. In a device of the kind described, the combination with a trolley pole having a trolley wheel at its upper end; of an attachment therefor comprising a substantially T-shaped member having one of the arms of the T forked and pivoted to the pole below said trolley wheel and the stem of the T extending normally parallel to the pole above the pivot point, a fork extending at an angle to the stem of the T, an auxiliary trolley wheel carried in said fork and adapted to roll on the trolley wire on which the first mentioned trolley wheel rolls, a pair of widely spread arms forming a fork extending from the end of the stem of the T, said arms being curved outward and upward, a trolley base to which said trolley pole is connected, a link connected to the second arm of the T-shaped member, and a spring connecting said link and trolley base whereby the auxiliary trolley wheel is constantly urged upward.

In testimony whereof, I affix my signature, in presence of two witnesses.

FLORION L. LUCAS.

Witnesses:
 CARL JUNGQUIST,
 DAVID JUNGQUIST.